United States Patent [19]

Worth et al.

[11] 4,356,984

[45] Nov. 2, 1982

[54] TOW BODY SYSTEM-TARGET DRONE

[75] Inventors: Robert N. Worth, Westlake Village; Larry T. Parson, Thousand Oaks, both of Calif.

[73] Assignee: Northrop Corporation, Hawthorne, Calif.

[21] Appl. No.: 124,499

[22] Filed: Feb. 25, 1980

[51] Int. Cl.³ .............................. B64D 3/00; F41J 9/10
[52] U.S. Cl. .................................. 244/1 TD; 273/361; 244/3; 244/139; 244/147
[58] Field of Search .................... 244/1 TD, 138 R, 3, 244/147, 139, 137 R, 149; 242/86.7, 156, 156.2; 273/360, 361; 114/244, 253

[56] References Cited

U.S. PATENT DOCUMENTS

| | | | |
|---|---|---|---|
| 2,751,167 | 6/1956 | Hopper et al. | 273/361 |
| 2,813,719 | 11/1957 | Hopper | 273/361 |
| 2,876,963 | 3/1959 | Selegue et al. | 244/3 |
| 2,898,058 | 8/1959 | Del Mar | 244/3 |
| 3,024,757 | 3/1962 | Aschinger | 114/244 |
| 3,058,692 | 10/1962 | Madden | 244/3 |
| 3,085,769 | 4/1963 | Jones | 244/3 |
| 3,135,511 | 6/1964 | Norman et al. | 273/360 |
| 3,451,642 | 6/1969 | Wieland et al. | 244/3 |
| 3,793,623 | 2/1974 | Gongurer | 114/244 |
| 4,000,867 | 1/1977 | Daikeler et al. | 244/1 TD |
| 4,248,394 | 2/1981 | Klummp | 244/3 |

FOREIGN PATENT DOCUMENTS

| | | | |
|---|---|---|---|
| 864819 | 5/1941 | France | 244/1 TD |
| 667202 | 2/1952 | United Kingdom | 273/361 |

Primary Examiner—Galen L. Barefoot
Attorney, Agent, or Firm—William W. Rundle; Robert J. Stern; John E. Peele, Jr.

[57] ABSTRACT

A tow target system for use with a remotely piloted aircraft, including deployment of the target(s) from wing launchers on a tow line, braking of the tow line, release of target and tow line from the aircraft, and parachute recovery of the jettisoned target. A dual tow reel and two tow target launchers are provided on the carrier aircraft for sequential operation of more than one towed target. Signals received from the ground control only the target deployment from its carrier and the later jettisoning of the towed target when desired. The braking system has automatically operative control means for pay-out speed, slowing, and stopping of the reels at predetermined line lengths. The parachute recovery is automatically initiated by aerodynamic control forces when target release is commanded.

8 Claims, 13 Drawing Figures

TOW BODY SYSTEM-TARGET DRONE

BACKGROUND OF THE INVENTION

1. Field of the Invention

The present invention relates to airborne targets, and more particularly, to towed target bodies which are deployed from drone aircraft and are released and recovered at expiration of the mission.

2. Description of the Prior Art

Airborne targets are in wide use for evaluation of missile performance and for training of weapon firing crews. In order to decrease the losses of expensive primary airborne targets, secondary targets have been towed behind a piloted or drone aircraft. Also, some of these secondary targets are built to be recovered and re-used. The present invention is aimed at providing a tow target system of the very least possible overall cost of operation.

U.S. Pat. No. 2,751,167 to Hopper et al discloses a reeling apparatus utilizing the airstream acting on a turbine with manually controlled deployment of the tow cable from a manned aircraft wherein provisions are made for deploying two targets, in sequence, using a single tow cable.

U.S. Pat. No. 2,919,869 to Hopper et al shows a tow target deployable from a manned aircraft wing using a tow reel near the airplane centerline, but the target is towed behind the wing-mounted launcher located outboard on the wing.

U.S. Pat. No. 2,923,549 to Hopper et al discloses a tow target launcher for use on an unmanned airborne vehicle, wherein the target launching and later jettisoning may be controlled by remote radio. The target is held attached by its nose to the carrier and is also towed at its nose.

U.S. Pat. No. 3,085,769 to Jones shows a towline reel decelerated by an electrically actuated magnetic brake for retraction of a towed target.

U.S. Pat. No. 3,451,642 to Wieland et al discloses a parachute recovery system for a towed aircraft wherein the system is automatically initiated when the towing cable goes slack. A similar recovery system in U.S. Pat. No. 4,000,867 to Daikeler et al is initiated by electrical contact of the slack towing cable with a contact ring on the towed aircraft skin.

U.S. Pat. No. 3,623,726 to Pittinger shows a tow target system which can carry four tow darts, each dart being towed at a top point slightly ahead of the center of gravity of the dart. The tow cable is housed within the tow body and the system inherently requires short deployment length.

These existing targets and components result in substantial weight and cost of an overall tow target system.

SUMMARY OF THE INVENTION

It is an object of this invention to provide a tow target system which is more economical to build and operate than existing conventional systems.

A specific object of the invention is to provide a novel means and method of deploying a tow target from a drone carrier aircraft and automatically stopping tow line pay-out at a predetermined distance behind the drone.

Another object is to provide a means of automatically recovering the towed target when it is jettisoned from the tow line.

Briefly, our invention comprises side-mounted tow bodies and preferably center-line mounted tow reels on a carrier aircraft, with a solid-state electronic braking control which measures reel rpm and tow line length. In the tow body, special landing recovery initiation means automatically operates after the tow line is released from the carrier to let go the tow body. The latter means preferably comprises a tow line attachment normally holding a parachute deployment circuit inactive but activating this circuit when the tow line is made to separate from the tow body.

DESCRIPTION OF THE PREFERRED EMBODIMENT

Figure 1:
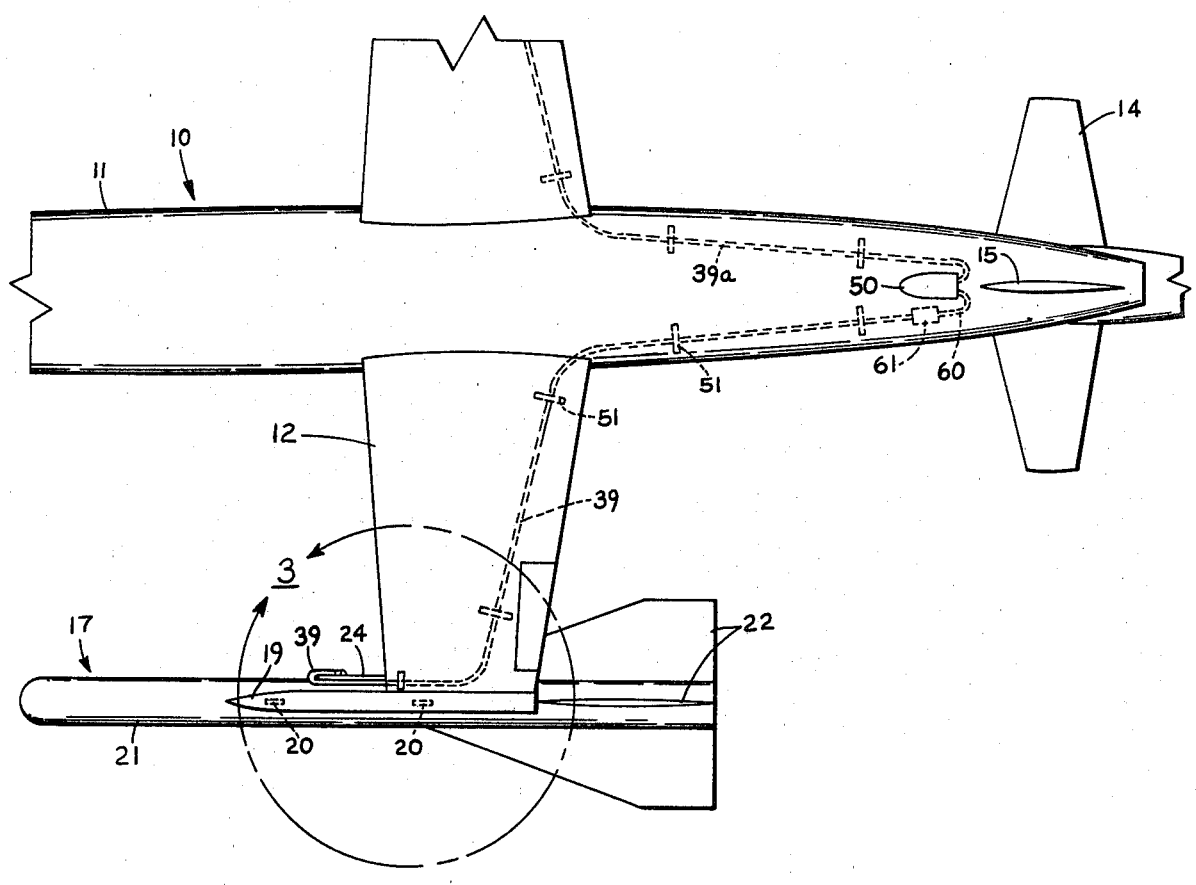
FIG. 1 is a plan view of an illustrative tow target system of the present invention, showing a drone aircraft with a tow target releasably mounted at a wing tip thereof.
Figure 2:
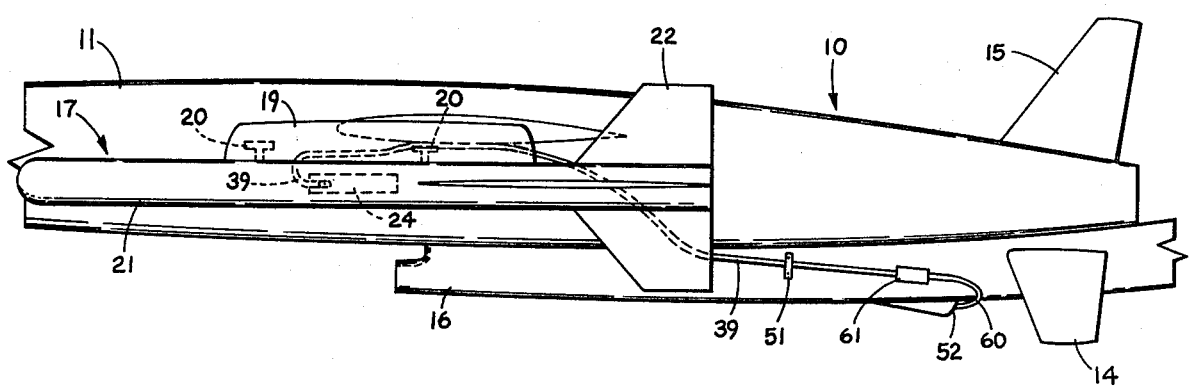
FIG. 2 is a left side view of the system of FIG. 1.

Referring first to FIGS. 1 and 2, a drone aircraft 10 has a fuselage 11, wing 12, tail assemblies 14 and 15, and a jet engine bay 16. At each wing tip (only one shown) a tow body such as a target 17 is mounted by means of a standard tip launcher 19 secured to the wing 12. With a two-target system, the tow targets such as 17 could be initially hung from anywhere on the left and right wing panels, or even from the fuselage 11, preferably from opposite sides thereof. As is customary, two launch lugs 20, for example, protruding from the tow target 17, fit into releasable hooks (not shown) mounted in the launcher 19 and are released to drop the tow target 17 at the receipt of an electrical command signal which opens the hooks by means of an explosive squib-operated rod, for example.

The tow target 17 in the present invention represents any of many types and sizes having installed therein various equipment depending upon the requirements of the weapons (missiles or guns) to be fired at it. If the tow bodies such as target 17 are relatively small compared to the carrier drone 10, several launchers 19 may be carried, each with a target thereon, it being understood that only one target is deployed and towed at a time, for practice firings at it. Then the towed target and its tow line are jettisoned and the next is deployed on its separate tow line when desired. Or, if the tow bodies such as the target 17 are relatively very large compared to the carrier drone 10, there may be only one actual target carried, with an aerodynamically matching dummy body being releasably carried on the opposite drone wing tip. Both the target and the dummy body would be dropped simultaneously from their wing launchers, but only the real target retained on a tow line, while the dummy continued to the ground.

Figure 3:
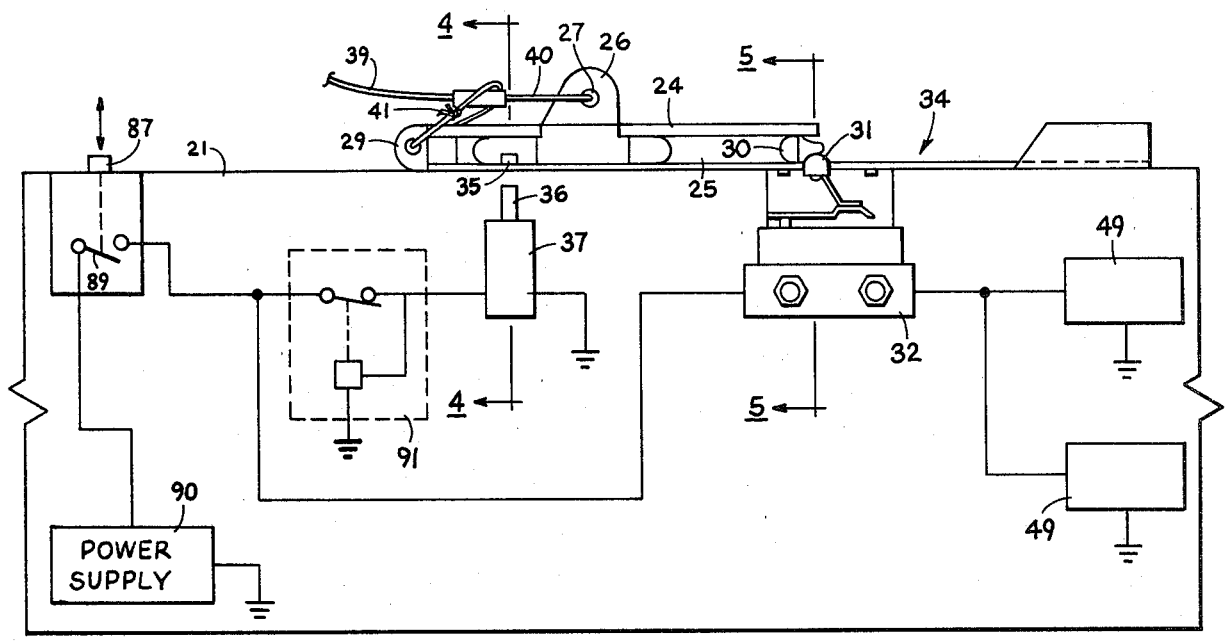
FIG. 3 is an enlarged broken-away portion of the tow target viewed as indicated by the broken line 3 in FIG. 1, showing tow line attachment to the tow target and also schematically showing the electrical circuits in the tow target.

The tow target 17 has a body 21 and tail surfaces 22, and contains internal equipment which will be referred to later. Near the center of the inboard side of target 17, when hanging from the wing tip, a longitudinal track 24 is attached, this track 24 being more fully shown in FIG. 3. The track construction forms a slotted channel 25 in which operates a slide member 26 having a tow line attachment hole 27.

Figure 4:
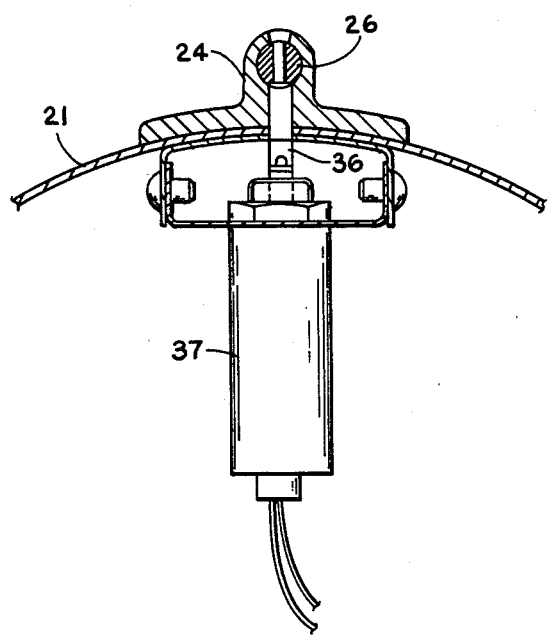
FIG. 4 is a detail of the forward portion of the tow line attachment track, viewed looking forward as indicated by broken line 4—4 in FIG. 3.
Figure 5:
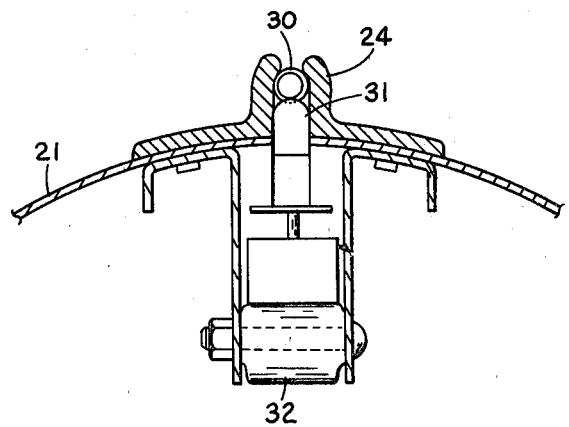
FIG. 5 is a detail of the rear portion of the same track, viewed looking forward as indicated by broken line 5—5 in FIG. 3.

The forward end of channel 25 contains a forward plug 29 pinned in place. This provides a stop for forward motion of the slide 26. A removable rear plug 30 is located aft in the channel 25 and normally holds a spring-loaded switch depressor 31 in the deenergized position of a recovery switch 32. FIGS. 4 and 5 show further details at forward and aft channel locations, respectively.

Behind rear plug 30, channel 25 has its outer slide-retaining portion removed, forming a cut-out 34 allowing insertion and removal of the slide 26 and rear plug 30.

In the forward position of slide 26, a notch 35 in the lower side thereof accommodates a solenoid plunger 36 for locking the slide 26 in its forward position when the solenoid 37 is energized.

When tow target 17 is hung in stored position from launcher 19, a tow line segment 39 having an end loop 40 is attached through the slide hole 27 and the slide 26 is moved to its forward position and safetied in place by a short length of breakable safety cord 41 tied through the forward plug 29 and the end loop 40. The forward end of channel 25, where the target 17 is towed from, is at or very near the longitudinal center of gravity of the tow target 17.

Figure 6:
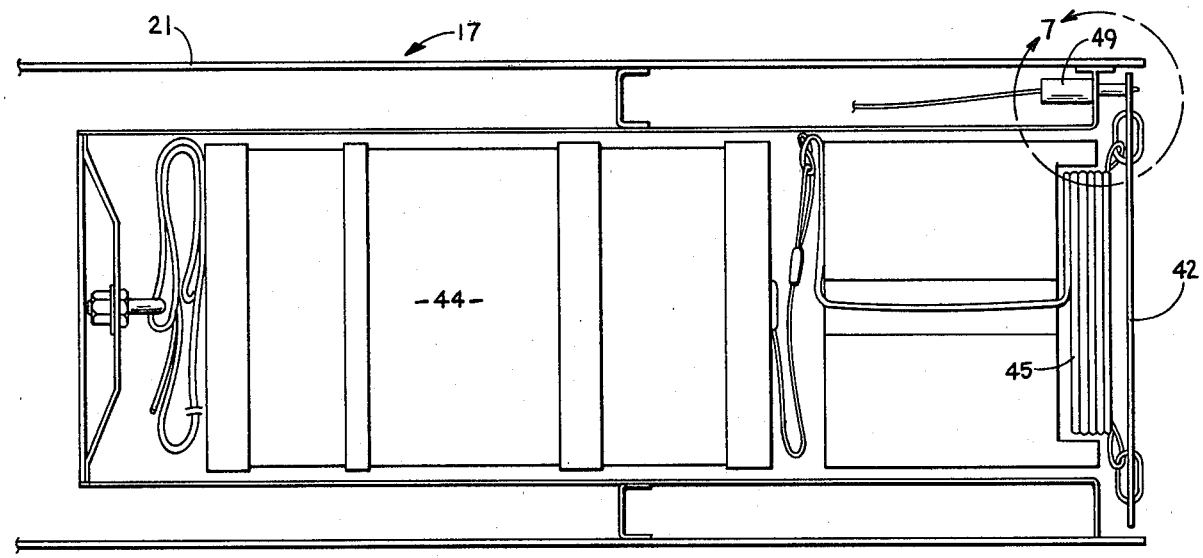
FIG. 6 is an enlarged broken-away aft portion of the tow target, showing the parachute recovery system.

Toward the rear of the tow target 17, as shown in FIG. 6, a target recovery system is provided. An aft cover 42 is installed over the rear end of the body 21, enclosing a compartment containing a parachute 44. A drogue line 45 is tied between the aft cover 42 and the parachute so that when cover 42 is forced off and away, the parachute 44 is automatically extracted.

Figure 7:
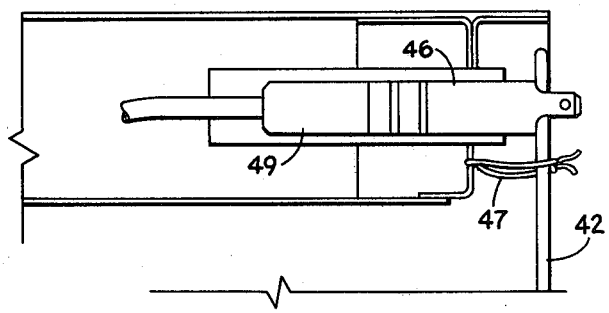
FIG. 7 is an enlarged sectional portion viewed where indicated by broken line 7 in FIG. 6, showing one of the parachute cover release cartridges.

The aft cover 42 is held in place over shouldered noses of pistons 46 (FIG. 7) by breakable nylon ties 47, for example, laced from fuselage structure through holes in the cover 42. Pistons 46 are parts of two or more explosive cartridges 49 spaced equally around the body circumference just beneath the outer skin. The cartridges 49 are electrically exploded after the target mission is completed, as will be described later, thus blowing out the pistons 46 and ejecting the aft cover 42. The remainder of the parachute installation is conventional.

Returning to FIGS. 1 and 2, the tow line segment 39 is routed as shown along the lower surface of wing 12 and aft along the fuselage 11 toward a tow reel assembly 50 located in its preferred position, just inside the fuselage 11 at the bottom centerline. Pull-apart clips 51, snaps or break ties can be used to retain the tow line segment 39 in place until the tow target 17 is deployed. A similar tow line segment 39a comes from the other tow target (not shown) on the opposite wing tip. The tow lines reach the reel assembly 50 through a rear-facing opening 52 in the bottom of the fuselage 11. The tow reel assembly may be mounted off-center of the aircraft 10 if this does not excessively alter the aircraft stability under towing conditions. A tow reel (or reels) can be housed in special pods or protuberances attached to the aircraft.

Figure 8:
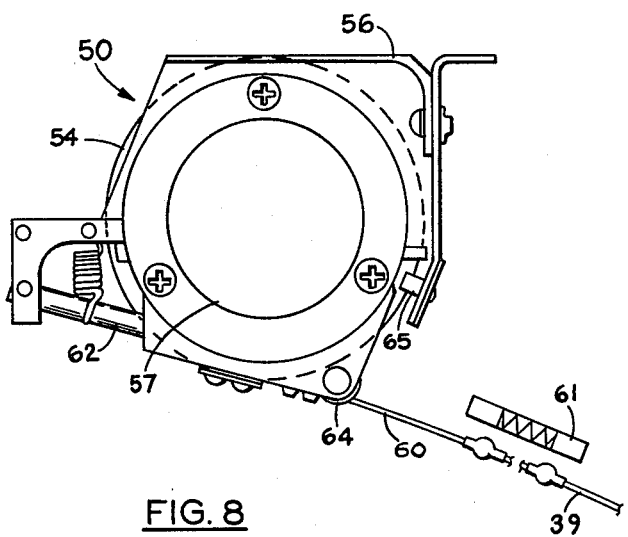
FIG. 8 is a left side view of the tow reel assembly as installed in the drone of FIG. 1.
Figure 9:
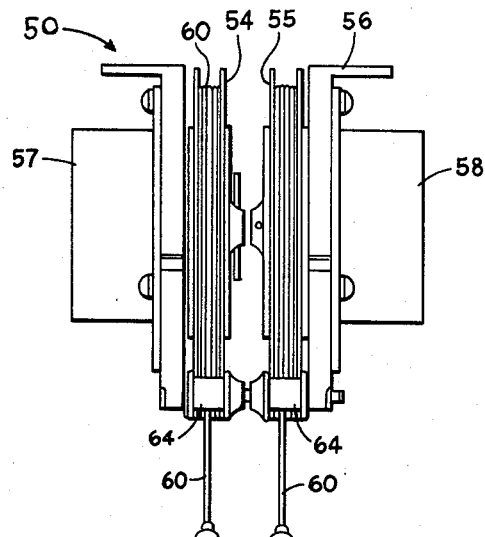
FIG. 9 is a rear view of the tow reel assembly of FIG. 8, with the bracket on the rear side removed for clarity.

Details of the tow reel assembly 50 are shown in FIGS. 8 and 9. A left spool 54 and a right spool 55 are provided, rotatable independently of each other, in a mounting bracket 56. The side-by-side spools are respectively fitted with magnetic particle brakes 57 and 58, which are electrically operated and have no friction plates. Control circuitry and operation of the brakes will be described later.

A main tow line 60 is wound on each spool 54 and 55, and a quick-disconnect fitting 61 provides for quick connection of the tow line segment 39 to the main tow line 60. This segment 39 is an energy absorbing cable to absorb the initial shock of deployment when the tow target 17 is dropped from the launcher 19 and pulls the tow line taut. The special cable segment 39 is constructed to provide approximately a 50% increase in length under initial load without breaking. Designing the size and length of the tow line segment 39 to the tow body weight, drag, and other deployment conditions thus controls the shock loads imposed.

A spring-loaded lever arm 62 produces pressure on the tow line 60 on each spool and helps provide anti-backlash control. A guide roller 64 contacting the tow line 60 a short distance away from the reel also aids in preventing the line from whipping about during payout and eliminates its wedging between the spools and mounting bracket.

Figure 10:
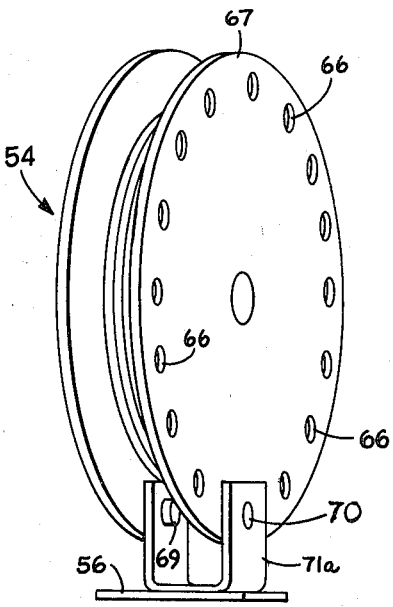
FIG. 10 is a diagrammatic perspective view of one of two reel spools in FIG. 9, showing the operational arrangement of reel speed sensing means.

For reel speed and tow line deployment distance control, rotation sensing means 65 (FIG. 8) are provided at each spool 54 and 55. As further shown in FIG. 10, each spool has a plurality of apertures 66, 16 for example, in one flange 67 near the rim. A light source 69 and a detector 70 are positioned on opposite sides of the flange 67, the latter two electronic elements being commercially obtainable in one integral detector assembly 71a and fastened to a portion of the reel mounting bracket 56 so that pulses of light are registered at the detector 70 as the spool 54 rotates. The light source 69 is a light emitting diode and the light detector 70 is a phototransistor, for example.

Figure 11:
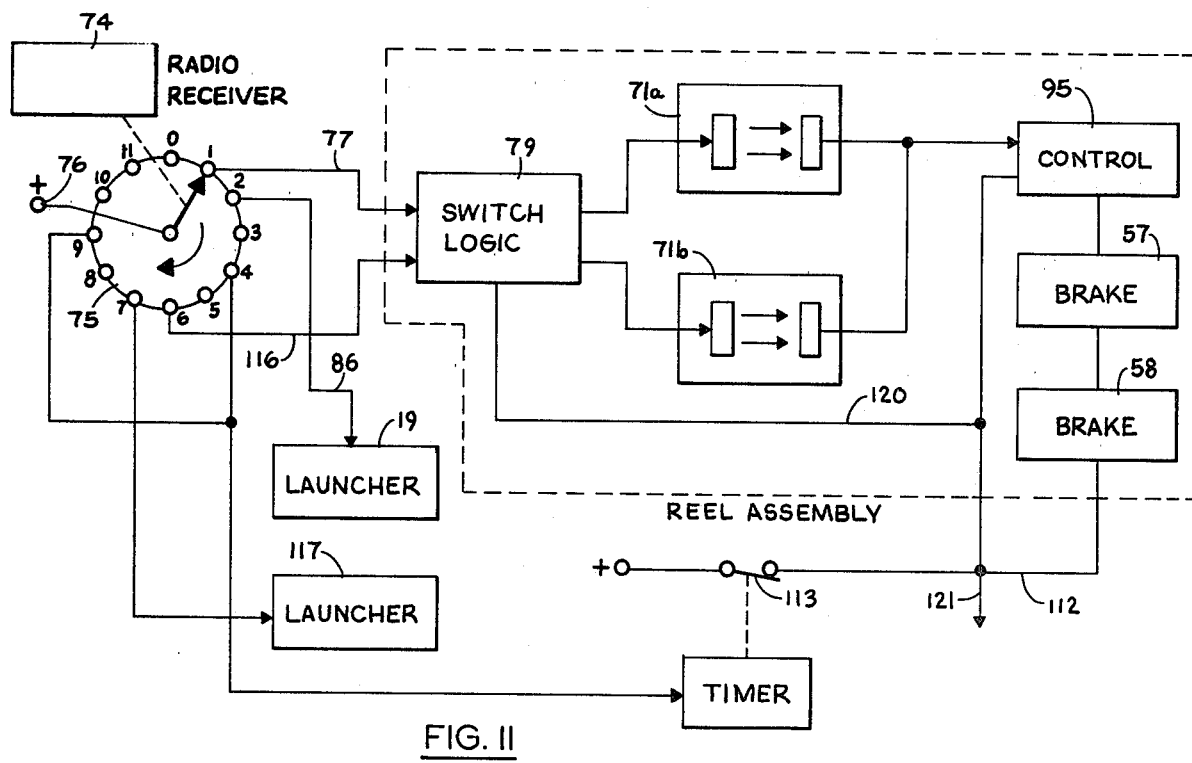
FIG. 11 is a combination electrical schematic and block diagram of all the electrical circuits in the drone having to do with the tow target system.

The tow target system is controlled by radio command signals from a remote location such as on the ground. As shown in FIG. 11, the tow target electrical equipment in the carrier drone includes a radio receiver 74 which controls a multiple position sequence switch 75. By means well known in the art, each separate radio control signal received advances the sequence switch 75 by one position, initially starting at position zero for example.

Just before the drone aircraft 10 reaches a desired position to deploy the first tow target, a command signal is sent to receiver 74 which causes sequence switch 75 to be stepped to position 1, as illustrated in FIG. 11. This switches a set-up voltage from a supply terminal 76 to a first input 77 of a switching logic circuit 79.

Figure 12:
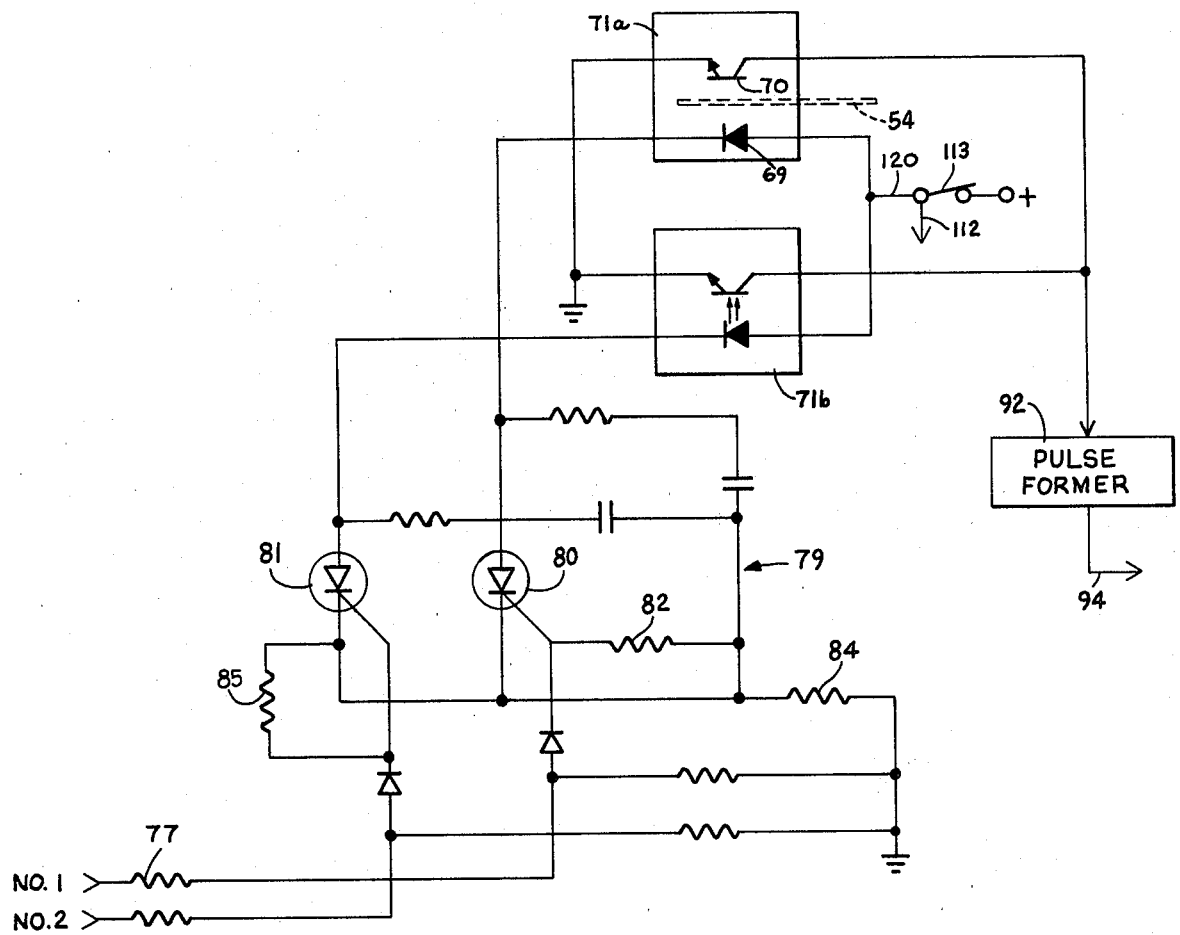
FIG. 12 is a detailed schematic diagram of a portion of FIG. 11, showing a portion of the brake control circuitry.

As further shown in FIG. 12, voltage on first input 77 of the switching logic 79 turns on a first one 80 of two electronic switches, such as silicon controlled rectifiers 80 and 81, for example, which energizes the detector assembly 71a for the particular tow reel spool of the first tow target to be deployed. This will be on the left spool 54 if the target on the left wing tip is the first to be dropped, of course.

At the same time as turning on the first SCR 80, the second SCR 81 is prevented from conducting by inhibiting resistors 82 and 84 and the common connection of the SCR cathodes. Similarly, inhibiting resistors 84 and 85 act to inhibit the first SCR switch 80 from conducting when the second SCR 81 is triggered on.

Now the circuits are ready for target deployment. Upon receipt of the next command signal, identical to the first, the sequence switch 75 (FIG. 11) is advanced to position 2. In this position, a first launcher circuit 86 is energized to open the hooks of first launcher 19 and drop the tow target 17 from the wing 12. As the target 17 separates from the launcher 19, a spring-loaded switch button 87 in the target (FIG. 3) which was physically held retracted by the launcher 19, is now released to close a power switch 89. This connects voltage from a power supply 90, such as a battery, in the tow target through a timer-operated solenoid switch 91 to the slide-locking solenoid 37. Energization of solenoid 37 extends its plunger 36 and locks the slide 26 in its forward position for only as long as the timer-operated switch 91 remains closed, approximately six seconds for example. As the target falls farther away, the tow line segment 39 pulls loose from the airframe clips 51 and stretches out when it initially becomes taut, thus absorbing and lessening the initial shock load. At the same time as the tow line is first becoming stretched, the safety cord 41 holding the slide 26 to the forward end of track 24 breaks. The slide remains in the forward position during this interval, however, as it is locked by solenoid 37. By the time solenoid 37 is deenergized at the end of its six-second interval after deploying from the launcher, the tow line tension and drag forces of the deployed tow target retain the slide 26 forward automatically.

As the main tow line 60 begins paying out from the reel, light from the light source 69 (FIG. 10) is formed into pulses reaching the detector 70 by virtue of the rotating spool apertures 66. Electrical pulses generated by detector 70 are further shaped as desired in a pulse former 92 (FIG. 12) and fed on a pulse output line 94 to a brake control circuit 95, the details of which are shown in FIG. 13.

Figure 13:
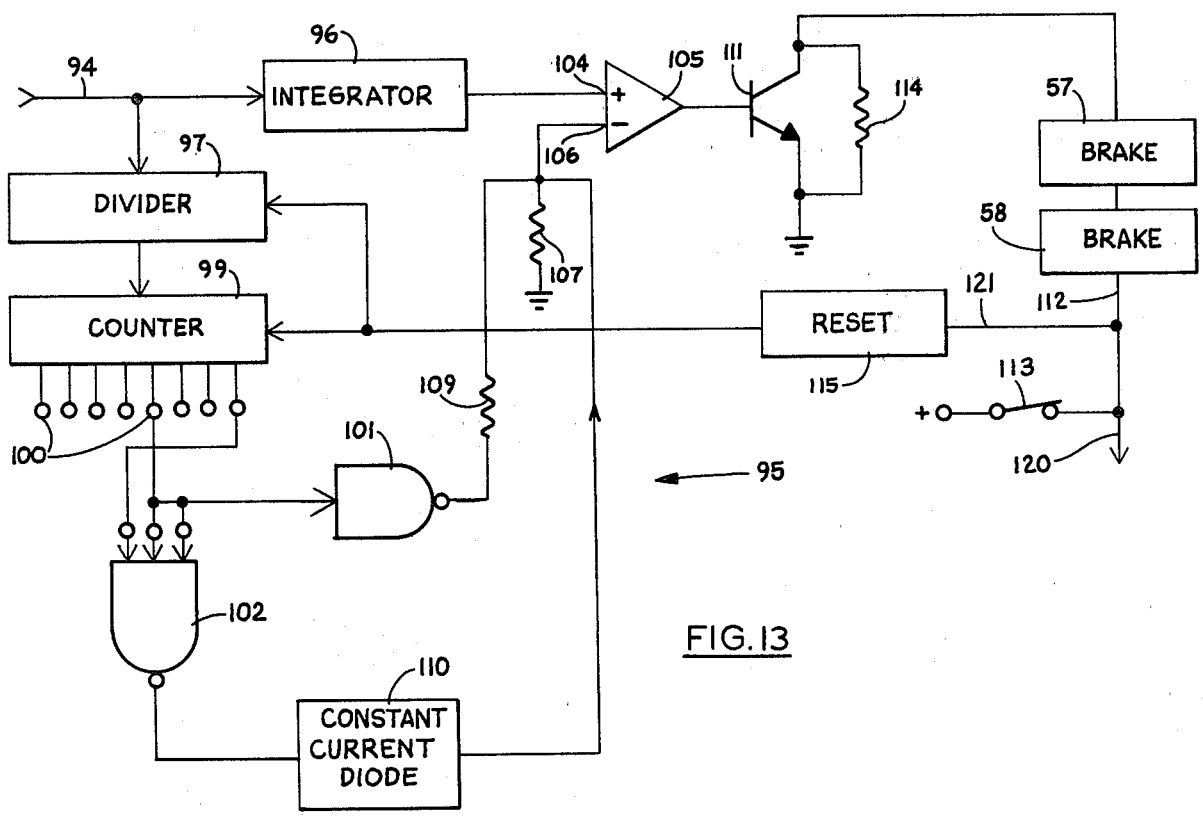
FIG. 13 is a detailed schematic diagram of another portion of FIG. 11, showing the remainder of the brake control circuitry.

Referring to FIG. 13, an integrator 96 connected to pulse output line 94 provides a dc output proportional to the rotational speed of the spool 54 (or 55 as the case may be). Pulse output line 94 is also connected to a divider 97 and the divider to a programmable counter 99, the output of which represents the length of tow line 60 which has payed out from the spool 54. The programmable counter 99 is a conventional binary counter having connections from the several output stages brought out to available distance terminals 100 so that various different selections can be easily made.

When the amount of tow line 60 unreeled reaches a first predetermined length, say at 80% of the final towed distance behind the drone 10, a slow-down gate 101 is actuated by the output of the selected distance terminal(s) 100 which are connected to the input of the slow-down gate 101. When the tow line length reaches a second predetermined amount, a stop gate 102 is actuated by the combination of selected distance terminals 100 connected to its input.

The output of integrator 96 is fed to the plus input 104 of a comparator such as a differential amplifier 105. The minus input 106 of differential amplifier 105 is provided with a reference signal coming from a parallel circuit including a summing resistance 107 to ground, a "reduce speed" resistance 109 connected to the output of the slow-down gate 101, and a constant current diode 110 to the output of the stop gate 102.

The output from differential amplifier 105 is connected to a power amplifier comprising an NPN transistor 111, preferably a switching type, having its emitter grounded and its collector connected to one end of the brake elements of the two brakes 57 and 58 in series. The other end of the series elements is connected through a brake power line 112 to a normally closed timer-operated brake power switch 113 which is in turn connected to operating voltage. Operation of this switch 113 (shown in FIGS. 11, 12 and 13) will be referred to later, together with certain circuits connected to it.

Returning to FIG. 13, it is important to note that a bias resistor 114 is connected across the emitter and collector of the power transistor 111. Normally, i.e., when the spool is not being braked, transistor 111 is cut off but a small anti-backlash bias current is flowing through the brakes and through the bias resistor 114. This causes a very slight drag on the spinning spool 54 or 55 and serves to prevent slack in the tow line from causing backlash at the spool.

As the tow line 60 is paying out and the speed of spool 54 is increasing, the dc signal at the plus input 104 of differential amplifier 105 increases beyond the threshold where transistor 111 turns on and thus allows full current through the brake 57. This turn-on point is designed to occur at a first predetermined spool speed, say 900 rpm for example, which is termed full speed. As the rpm falls below 900 due to braking action, the amplifier 105 removes brake power, allowing speed to increase again. This on-off cycle is repeated at a relatively fast rate so that the actual controlled speed is fairly constant.

Now when the first predetermined length of tow line is payed out, actuation of the slow-down gate 101 by counter 99 produces a modified voltage at the minus input 106 of differential amplifier 105 in the sense to cause full application of the brake until a second, slower, predetermined spool control speed is reached, say 200 rpm for example. The spool speed remains substantially constant around this lowered figure until the second predetermined length of payed out tow line is reached, at which point the stop gate 102 is actuated, removing the input to the constant current diode 110. This causes a continuous full power braking signal from the differential amplifier 105 to stop the spool 54 and hold it stopped. Of course the stop gate 102 is actuated at a point far enough ahead of the actual line's end so that the tow line will not completely unwind, until later when it is desired to be jettisoned.

It is noted at this time that the electrical elements of both brakes 57 and 58 are simultaneously acted upon since they are wired in series. The second spool 55, however, is not moving or involved in tow system operation at this time. Both brakes could be wired in parallel if the design loads call for it.

The tow target 17 is now being towed at its prescribed distance behind the carrier drone 10. This might be around 300 feet for example. The sequence switch 75 may be signalled to step to position 3 which is blank for safety reasons.

When the first target mission is completed, another radio signal is sent to the receiver 74, which advances the sequence switch 75 to position 4. As shown in FIG. 11, this opens the timer-operated brake power switch 113 and keeps it open until timed out, which is selected to be one minute in this example. When the brake voltage is thus removed, the brakes 57 and 58 are released entirely, and air drag on the target 17 pulls the remaining tow line 60 off of spool 54, jettisoning the tow target and tow line.

Further, when the brake power switch 113 was opened, electrical power was removed from an SCR supply line 120 and thus from the one SCR 80 which was conducting, as shown in FIG. 12. This deactivates the inhibiting means in the SCR circuits and will allow the opposite SCR to be triggered later. Also, opening the brake power switch 113 removed voltage from a reset lead 121 and thus from a counter reset gate 115 (FIG. 13) so that the brake control system will be ready to operate for a second tow target. When power is restored at the end of the one minute time, the counter 99 is reset to zero.

As the tow target falls through the air, the parachute recovery system automatically comes into effect. First, the tow line 60 will pass to the rear relative to the target body, due to wind resistance, and this will pull the slide 26 to the rear in its track 24. See FIG. 3 again. The slide 26 strikes the rear plug 30 and forces it out, and the slide 26 itself separates from the channel 25, letting the entire length of tow line fall to the ground.

Ejection of rear plug 30 allows the recovery switch 32 to close, which completes the electrical circuit firing the explosive cartridges 49. This blows off the aft cover 42 (FIG. 6) and extracts the parachute 44 as described earlier, thereby lowering the tow body 17 safely to the ground.

Meanwhile, the sequence switch 75 in the drone 10 may be commanded to advance to position 5, which is preferably blank, although not necessarily. The drone may now be flown to the position where deployment of a second tow target is to take place.

To prepare to launch the second tow target (not shown) on the right-hand wing, for example, another radio signal is sent to the drone receiver 74 to step the sequence switch 75 to position 6. This connects a set-up voltage to a second input 116 of the switching logic circuit 79, where, by operating similarly as described earlier, the light detector assembly 71b on the right spool 55 is energized. This is assuming that enough time has elapsed since the timer-operated brake switch 113 has been opened, so that this switch is now closed again and power is available at the brake control system and its switching logic.

The next command signal advances sequence switch 75 to position 7 to open the hooks of the second launcher 117 (FIG. 11). Braking of right spool 55 is the same as before with the left tow target 17, it being noted that the output circuits of light detector assemblies 71a and 71b are connected in parallel so that only a single set of integrator 96, counter 99, differential amplifier 105 and associated components, is required. The second (right hand) target can be jettisoned after its use by stepping the sequence switch 75 to position 9 (position 8 is also blank in this example).

It is obvious that there are other detailed ways of constructing the various tow target release mechanisms and electronic circuits which are equivalent to those illustrated herein.

Thus it is seen that a new and improved tow target system has been provided by the present invention. The tow targets may contain one or more of the following items, for example: radar or infra-red reflecting means, antennas, scoring systems for projectile detection, a light system for visual detection, and the like. The reel braking system can be tailored to provide for a wide variety of target sizes, deployment speeds and tow separation distances, such as by varying the number of apertures 66 in the brake spools, the spool size (both diameter and width), the capacities of the counter 99 and divider 97, brake parameters, and the like. The system automatically accommodates the deployment of multiple targets, sequentially operated. The target jettison and recovery system is of simple construction and utilizes the existing aerodynamic forces for much of its operation control.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

What is claimed is:

1. A tow target system comprising:
   a tow body releasably carried on the carrier aircraft;
   a tow reel mounted on the carrier aircraft; and
   a tow line wound on the tow reel and connected to the tow body;
   wherein said tow reel includes
      a controllable brake,
      speed control means for automatically energizing the brake to a slowing condition responsive to reel speed greater than a predetermined control speed and for deenergizing the brake to an "off" condition responsive to reel speed less than the control speed, and
      means for automatically changing said control speed from a first control speed to a slower control speed when a desired partial length of said tow line has unwound.

2. Apparatus in accordance with claim 1 including stopping means for energizing said brake continuously to its slowing condition to stop said tow reel and the unreeling of tow line therefrom, said stopping means actuated in response to a desired final length of said tow line unwound from said reel means, said final length being greater than said partial length.

3. A tow target system comprising:
   a carrier aircraft;
   a tow body releasably carried on the carrier aircraft;
   a tow reel mounted on the carrier aircraft; and
   a tow line wound on the tow reel and connected to the tow body;

wherein said tow reel includes a controllable brake and speed control means for automatically energizing said brake to a slowing condition responsive to reel speed greater than a predetermined control speed and for deenergizing said brake to an "off" condition responsive to reel speed less than said control speed; and wherein said speed control means comprises means for producing pulses at a frequency proportional to reel speed, means for translating said pulses into an electrical signal having a magnitude proportional to reel speed, means for producing an electrical reference signal, means for comparing said two electrical signals, means for providing a braking signal when the output of said comparing means is indicative of said control speed, and means for automatically changing said electrical reference signal to effectively produce a slower control speed when a desired length of said tow line has unwound.

4. Apparatus in accordance with claim 3 wherein said means for changing said reference signal comprises means for counting the number of pulses from said pulse producing means, and gate means responsive to the output of said counting means for modifying said reference signal.

5. A tow target system comprising:
a carrier aircraft;
a tow body;
a tow line attachment member mounted on the tow body;
a tow line connected between the carrier aircraft and the tow line attachment member;
means for disconnecting the tow line from the carrier aircraft;
means for deploying a landing recovery system carried in the tow body;
wherein said tow line attachment member is slidably mounted on said tow body so as to allow rearward movement of said slidable attachment member in response to aerodynamic forces on said tow line caused by its wind resistance after its disconnection from the carrier aircraft; and means for activating said deploying means in response to rearward movement of said slidable member.

6. Apparatus in accordance with claim 5 further comprising means for separating said tow line from said tow body upon said rearward movement of said slidable member.

7. A tow target system comprising:
a carrier aircraft;
launching means mounted on said aircraft for releasably carrying a tow body to be deployed;
a tow body releasably carried on said launching means;
tow reel means mounted near the lower side of said aircraft;
a tow line wound on said reel means;
tow line attaching means for connecting said tow line to the outside of said tow body;
means for releasing said tow line from said tow reel means;
a landing recovery system carried in said tow body; and
means for deploying said recovery system;
wherein said tow line attaching means comprises a track attached to said tow body, a slide member slidable fore and aft in said track, means for pivotally connecting said tow line to said slide, means for temporarily holding said slide in a forward position in said track when said tow body is released from said launcher, a removable plug in the rear of said track positioned in the path of said slide, said plug holding said recovery system deploying means deactivated against the action of an elastic element, said plug adapted to be ejected from said track by said slide and permit said slide to separate from the rear of said track, whereby aerodynamic forces on said tow line after its release from said tow reel means pull said slide rearward out of said track to separate said slide and said tow line from said tract and activate said recovery system deploying means.

8. Apparatus in accordance with claim 7 wherein said recovery means comprises a parachute and said deploying means comprises at least one explosive cartridge for extracting said parachute.

* * * * *